United States Patent [19]

Bauman et al.

[11] Patent Number: 5,252,627

[45] Date of Patent: Oct. 12, 1993

[54] APPARATUS AND METHOD FOR BLENDING AND DISPENSING FOAMABLE, CURABLE ORGANOSILOXANE COMPOSITIONS

[75] Inventors: Therese M. Bauman, White Lake Twp.; Todd S. Klenk, Fenton, both of Mich.

[73] Assignee: Dow Corning Corporation, Midland, Mich.

[21] Appl. No.: 174

[22] Filed: Jan. 4, 1993

[51] Int. Cl.$^5$ .............................................. C08J 9/02
[52] U.S. Cl. ..................................... 521/154; 521/91; 521/110; 521/917
[58] Field of Search ................... 521/110, 91, 154, 917

[56] References Cited

U.S. PATENT DOCUMENTS

| | | | |
|---|---|---|---|
| 3,923,705 | 12/1975 | Smith | 260/2.5 S |
| 4,599,367 | 7/1986 | Bauman et al. | 521/71 |
| 4,778,631 | 10/1988 | Cobbs, Jr. et al. | 261/128 |
| 4,888,217 | 12/1989 | Jones | 427/236 |
| 5,079,292 | 1/1992 | Hoffman et al. | 524/862 |
| 5,082,142 | 1/1992 | Saidman et al. | 222/1 |

OTHER PUBLICATIONS

"A Guide To Static Mixers" (Plastics World, May 1992, pp. 63–66).

*Primary Examiner*—Morton Foelak
*Attorney, Agent, or Firm*—Robert Spector

[57] ABSTRACT

An apparatus for preparing foams exhibiting a uniformly small cell size, a minimum number of ruptured cell walls and a smooth surface from foamable curable compositions comprises means to transport the ingredients of a foamable, curable composition to the input of a static mixer in which the ingredients of the composition are blended to homogeneity prior to being extruded into an exit zone and through an exit orifice. The length to diameter ratio of the mixing zone and the diameter of the exit orifice are within specified ranges.

5 Claims, 1 Drawing Sheet

APPARATUS AND METHOD FOR BLENDING AND DISPENSING FOAMABLE, CURABLE ORGANOSILOXANE COMPOSITIONS

BACKGROUND OF THE INVENTION

1. Field of the Invention

This invention relates to a mixing and dispensing apparatus for foamable compositions. More particularly, this invention relates to an apparatus and a method for blending and dispensing the ingredients of foamable, curable organosiloxane compositions. The cured foam is soft, flexible and exhibits a uniform distribution of small diameter cells. The present apparatus and method are particularly useful for preparing small diameter elongated articles such as foamed-in-place gaskets.

2. Background Information

Foamable organosiloxane compositions that generate hydrogen gas as a blowing agent during curing of the composition are known in the art, and are described in U.S. Pat. Nos. 3,923,705; 4,599,367; 4,888,217; and 5,079,292.

The prior art also describes numerous devices for blending two-part compositions containing a thermosetting organic or organosilicone polymer with a compressed gas or a chemical blowing agent in a confined area and dispensing the resultant mixture into the atmosphere where the entrapped gas forms a foam as the composition cures. Devices of this type are described in U.S. Pat. Nos. 4,778,631, which issued to Cobbs et al. and 5,082,142, which issued to Saidman et al. on Jan. 21, 1992. The Saidman et al. patent teaches dissolving the blowing agent in the one of the two parts of the composition and blending the two parts in a static mixer immediately prior to dispensing the composition from the apparatus.

The Saidman et al. patent does not require a particular nozzle configuration at the output of the static mixer to produce a useful foam.

An article by C. Rauwendaal entitled "A Guide To Static Mixers" (Plastics World, May 1992, pages 63–66) defines static mixers as devices designed to "split and reorient the flow and, thus, impart improved distributive mixing to the fluid". This article recommends mixers with a length to diameter ratio of at least 10 to achieve adequate mixing and product uniformity using the most efficient static mixers described in the article. This mixers are identified as type SMX manufactured by Sulzer and type ISG manufactured by Ross.

Rauwendaal considers static mixers containing the Kenics type of mixing element simple and easy to clean, but less efficient. Mixers containing these elements require a length to diameter ratio of at least 29 to achieve efficient mixing.

The present inventor discovered that when a static mixer is used, the diameter of the orifice through which the composition passes when exiting the device is critical to preparing a foam exhibiting uniform cells that are preferably no larger than two millimeters and contain a low percentage, typically less than 10 percent, of cells with ruptured walls. The present method and associated apparatus are based on this discovery. In accordance with the present invention, nozzles with an exit orifice smaller than 1.50 mm permit use of a static mixer containing Kenics type elements with a lower length to diameter ratio (11) than taught by the art, including the aforementioned article by C. Rauwendaal, which recommends a length to diameter ratio of at least 29 to achieve product uniformity using this type of mixing element.

SUMMARY OF THE INVENTION

The ingredients of foamable organosiloxane compositions are blended and dispensed in a pressurized apparatus comprising a static mixer and a nozzle with an exit orifice that does not exceed 1.50 mm in diameter. The resultant foams exhibit a uniformly small cell size, at most about 5 percent of ruptured cell walls and a smooth surface.

DETAILED DESCRIPTION OF THE INVENTION

This invention provides an apparatus for blending and dispensing a foamable organosiloxane composition, said apparatus comprising 1) a mixing zone consisting essentially of a channel having an inlet and an outlet and containing a plurality of static mixing elements positioned within the channel, where the ratio of the length of said channel to its diameter is at least 11, and 2) an exit zone communicating with the outlet of said channel and comprising a nozzle containing an exit orifice where the diameter of said exit orifice does not exceed 1.50 mm.

This invention also provides a method for blending and dispensing a foamable organosiloxane composition, the method comprising transporting said composition under pressure first through a mixing zone consisting essentially of a channel having an inlet and an outlet and containing a plurality of static mixing elements positioned within the channel, where the ratio of the length of said channel to its diameter is at least 11, and second through an exit zone communicating with the outlet of said channel and comprising a nozzle containing an exit orifice where the diameter of said exit orifice does not exceed 1.50 mm.

Figure 1:
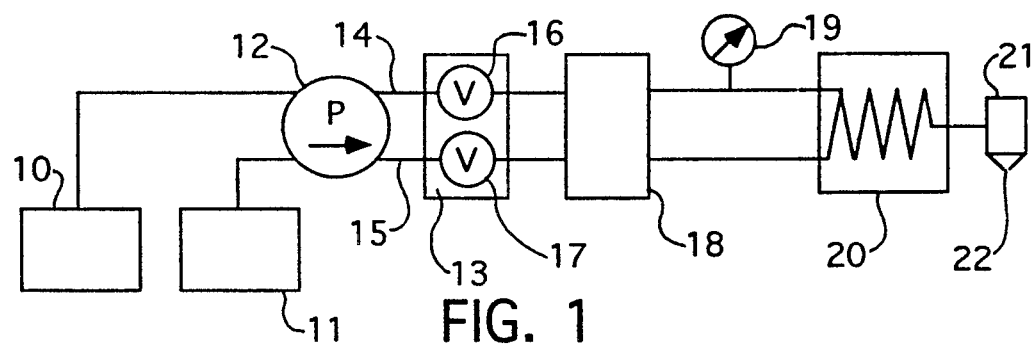
FIG. 1 is a diagrammatic view of an apparatus of the present invention suitable for use in dispensing two part organosiloxane compositions.

The arrangement and interconnection of the components that constitute the present blending and dispensing apparatus can be understood by referring to FIG. 1 of the accompanying drawings. The two parts of a foamable organosiloxane composition are transported from their respective storage containers 10 and 11 through the apparatus by means of a pump 12. The two parts of the composition enter a flow control manifold 13 through individual conduits 14 and 15 equipped with valves 16 and 17 that control the flow of material through the conduits. The relative flow rates in the two conduits is controlled using a metering manifold 18 equipped with a pressure gauge 19. The flow control and metering manifolds constitute the entrance zone of the apparatus.

The two steams of ingredients of the foamable composition from the metering manifold are combined in the entrance section of a static mixer 20 having a length to diameter ratio of at least 11:1.

Static mixers are well known in the art. This mixers are designed to provide an efficient blending of ingredients flowing in a channel without use of moving parts. This is achieved by placing a plurality of devices or elements within the channel that split and reorient the flow of material within the channel. The elements are typically stacked in a series with each element rotated 90 degrees with respect to the next element in the series. The configuration of these devices determines the efficiency of the mixer, which can be expressed as the minimum length to diameter ratio required to achieve a homogeneous blend of ingredients exhibiting less than a 1% variation in composition between randomly selected portions of the blended material.

The length to diameter ratio of static mixers used in accordance with the present method is greater than 11.

The efficiency of static mixers containing various element configurations is discussed in the article by Rauwendaal mentioned in a preceding section of this specification.

A preferred element configuration, based on its availability, simplicity and ease of cleaning is referred to as "Kenics". This element is in the form of a twisted tape. Other available elements are in the form of bars, corrugated plates, and bent and split tapes. The length to diameter ratio of static mixers containing the Kenics type of mixing element is preferably from 11 to 35.

During passage through the mixer the ingredients of the composition are blended to homogeneity before entering the exit zone 21 containing the exit orifice 22. The diameter of the exit orifice is critical to the cell structure of the final foam, and should be less than 1.50 mm.

An orifice diameter of below about 0.5 mm. will restrict the flow of the foamable composition to the extent that the pressure used to transport the composition through the present apparatus must be increased beyond conventional values to achieve a useful flow rate without any benefit in increased quality of the cured foam. The diameter of the exit orifice is preferably from 0.7 to 1.5 mm.

Figure 2:
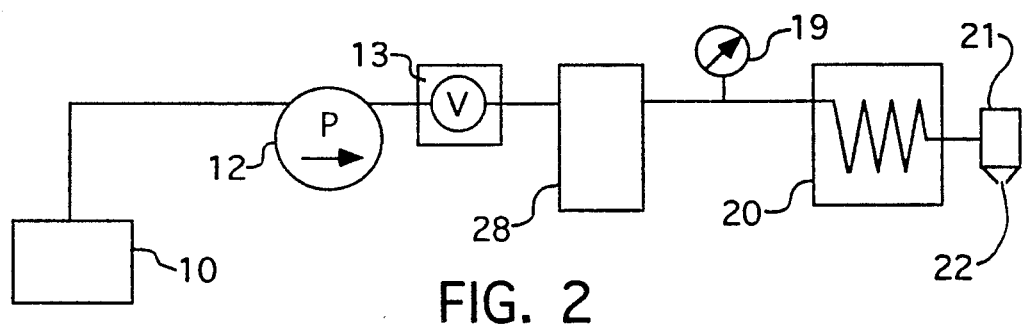
FIG. 2 is a diagrammatic view of the apparatus of FIG. 1 modified for dispensing one-part compositions containing a microencapsulated catalyst.

The apparatus shown in FIG. 2 is suitable for dispensing one-part foamable organosiloxane compositions containing a catalyst that is microencapsulated in a layer of a thermoplastic resin. Storage containers 10 and 11 are replaced by a single container 10 and conduits 14 and 15 by a single conduit. Because only one stream of ingredients is present, a metering manifold is no longer necessary.

The apparatus includes a heating device 28 that can be located between the flow control manifold and the static mixer 20. The purpose of the heating device is to soften the resin encapsulating the catalyst, thereby allowing the catalyst to combine with the other ingredients of the organosiloxane composition. The catalyst is uniformly dispersed throughout the composition in the static mixer.

Figure 3:
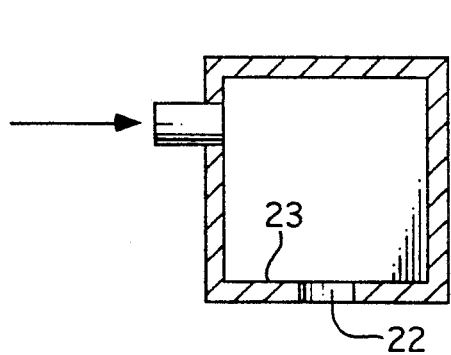
FIGS. 3, 4, 5 and 6 are cross-sectional views of four preferred exit zone and nozzle configurations.

Cross-sectional views of preferred exit zone configurations are depicted in FIGS. 3, 4, 5 and 6. The interior of the nozzle shown FIG. 3 is cylindrical in contour with a diameter from about 0.5 to about 1.5 cm. The exit orifice 22 is located on a surface 23 of a wall that is substantially perpendicular with respect to the axis of the cylindrical exit zone and preferably from 2.5 to 12.7 mm thick.

Figure 4:
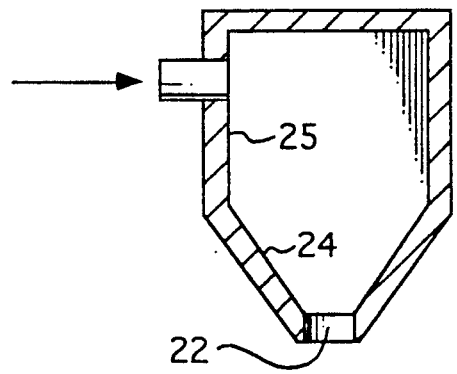

The configuration shown in FIG. 4 contains the exit orifice at the apex of a conical section 24 that is adjacent to a cylindrical section 25. The interior angle defined by the inner surface of the conical section and the adjoining inner surface of the cylindrical section is from 135 to about 160°.

The configuration of FIG. 4 adds a needle-shaped flow control valve 26 to the exit zone of FIG. 3. In a preferred embodiment the valve is biased toward a position blocking exit orifice 22 by means of a spring (not shown). When it is desired to discharge material through the exit orifice, the valve is moved away from the orifice by applying sufficient pressure to offset the force exerted by the spring.

Figure 6:
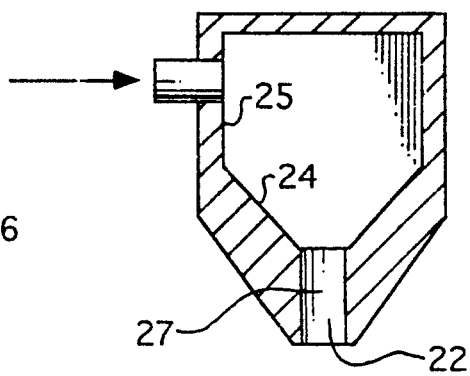

The configuration shown in FIG. 6 contains a passage 27 connecting the apex of the conical section 24 of the exit zone shown in FIG. 3 with the exit orifice 22. The diameter of this passage is substantially equal to the diameter of the exit orifice and the passage can be from about 2.5 to about 12.7 mm. in length.

THE FOAMABLE ORGANOSILOXANE COMPOSITION

Any of the known one and two-part curable organosiloxane compositions that generate a gas such as hydrogen as a by-product of the curing reaction can be used in the present mixing and dispensing apparatus. Preferred compositions of this type are described in U.S. Pat. Nos. 4,599,367; 3,923,705; 4,888,217 and 5,079,292. Foamable compositions of this type contain an organohydrogensiloxane and at least one curable polyorganosiloxane containing silicon-bonded hydroxyl groups and/or silicon-bonded alkenyl radicals such as vinyl, allyl or hexenyl. If the composition does not contain a polyorganosiloxane with silicon-bonded hydroxyl groups, also referred to herein as silanol groups, the curable composition contains sufficient water and/or liquid alcohol to react with the organohydrogensiloxane to generate the hydrogen gas that functions as the blowing agent during curing of the composition.

The curing and hydrogen generating reactions are catalyzed by a platinum group metal or a compound of such a metal. The term "platinum group metal" typically includes platinum, rhodium and palladium. The reaction between silanol groups and silicon bonded hydrogen atoms can be catalyzed by inorganic and organic tin compounds.

The curing and gas-generating reactions involving silanol groups can be depicted as

The curing reaction involving vinyl as the alkenyl radical can be depicted as ≡SiCH=CH₂+ =SiH→ SiCH₂CH₂Si≡, and occurs in conjunction with a reaction between silanol groups, water and/or alcohol present in the composition to generate hydrogen.

where Y is ≡Si—, R— or H—.

To produce the desired crosslinked polymer structure in the final foam either the organohydrogensiloxane contains at least three silicon-bonded hydrogen atoms or the polyorganosiloxane contains at least 3 silanol or silicon-bonded alkenyl radicals per molecule.

The silanol- and alkenyl-substituted polyorganosiloxanes are typically linear or branched liquid polydiorganosiloxanes that contain two or more silanol groups or alkenyl radicals per molecule, preferably at least on the terminal silicon atoms. The alkenyl radical is preferably vinyl or hexenyl, and the silicon-bonded organic groups other than the alkenyl radicals are preferably methyl, phenyl, or 3,3,3-trifluoropropyl. Most preferably each silicon atom of the polyorganosiloxane contains at least one methyl radical. These polyorganosiloxanes contain from 0.0002 to 3 weight percent of alkenyl radicals and exhibit viscosities of from 1 to about 500 Pa.s, preferably from 1 to 200 Pa.s.

The organohydrogensiloxanes can have a linear or branched structure and preferably contain an average of more than two silicon-bonded hydrogen atoms per molecule. Suitable organohydrogensiloxanes contain from 0.5 to 2.5 weight percent of silicon-bonded hydrogen and exhibit viscosities of from 0.01 to about 10 Pa.s.

Preferred compositions for use with the apparatus of the present invention contain from 1 to about 10 weight percent of at least one alcohol that is liquid at 25° C. These compositions typically produce low density cured foams and contribute to the resiliency of the final cured foam. Suitable alcohols include aliphatic and araliphatic alcohols containing up to eight carbon atoms. Propanol and benzyl alcohols are preferred.

In addition to the polyorganosiloxanes containing alkenyl radicals and/or silanol groups, the organohydrogensiloxane and a curing catalyst, foamable curable organosiloxane compositions may also contain ingredients typically present in organosiloxane compositions that cure by a hydrosilation reaction. These ingredients include but are not limited to reinforcing and non-reinforcing fillers, catalyst inhibitors such as acetylenic alcohols and cyclic methylvinylsiloxanes, pigments, dyes, heat stabilizers, adhesion promoters and flame retarding agents.

To achieve a useful storage stability at temperatures from 25 to about 40° C. organosiloxane compositions that cure by the reaction of an organohydrogensiloxane with silanol groups and/or alkenyl radicals are packaged in two parts with the organohydrogensiloxane and the curing catalyst in separate containers.

The apparatus shown in FIG. 2 of the accompanying drawings is suitable for use with one-part organosiloxane compositions. The storage stability of one-part compositions that cure by a platinum- or tin catalyzed reaction can be increased by encapsulating the catalyst in finely divided particles of a thermoplastic organic or organosilicon resin. When it is desired to cure the composition, it is heated above the softening temperature of the resin. The composition should then be passed through the mixing zone of the present apparatus to distribute the catalyst uniformly throughout the composition. In this instance the apparatus of FIG. 1 in the accompanying drawings can be modified by replacing containers 10 and 11 with a single container, conduits 16 and 17 with a single conduit, and inserting a heating device downstream relative to the mixing zone.

Curable compositions suitable for use with the mixing and dispensing apparatus of the present invention exhibit viscosities of from 1 to about 200 Pa.s, and can be dispensed at rates from about 10 to about 120 grams per minute, depending upon the pressure in the dispensing apparatus and the viscosity of the composition.

In accordance with the present method for preparing cured foams, the two parts of a curable and foamable organosiloxane composition are transported under pressure through a mixing manifold which meters and combines the two streams of ingredients and feeds them into a static mixer in which the ingredients are blended to homogeneity. As described in a previous section of this specification, a single storage container and a heating device are present if a one-part composition containing a microencapsulated foaming/curing catalyst is used. Two part compositions are typically maintained at ambient temperature in the apparatus to avoid premature curing of the composition.

From the mixer the composition flows into an exit chamber containing an orifice through which the composition is discharged from the exit chamber into the atmosphere where it foams and cures. The composition is under pressures in the range of from 200 to 1000 psi from the time it enters the mixing manifold until it emerges from the exit orifice.

The foams produced in accordance with the present method exhibit average cell diameters of less than 5 mm, preferably less than 1 mm. and densities in the range from 10 to about 30 pounds per cubic foot.

EXAMPLES

The following examples demonstrate 1) the criticality of the dimensions of the exit orifice on the cell structure and uniformity of the final cured foam and 2) how the length to diameter ratio of the static mixer can be reduced to below the minimum value recommended in the prior art for the type of mixing element used, i.e. a ratio of 29 for the Kenics type element in the article by Rauwendaal discussed in a preceding section of this specification.

The apparatus described in the examples represents a preferred embodiment, and should not be interpreted as limiting the scope of the accompanying claims. Unless otherwise specified all parts and percentages are by weight and viscosities are the values measured at 25° C.

The two parts of a foamable organosiloxane composition were pumped from individual storage containers into the entrance zone of the apparatus using a dual chamber air powered piston pump. The metering device was an air pressure activated valve containing two cylindrical passages, each with an area of 38.8 square millimeters.

From the valve the composition entered a mixing manifold that controlled the relative volumes of the two streams of ingredients entering a 6 cm - long cylindrical passage with an inside diameter of 3.9 mm. This passage was connected to the input of one of three different types of static mixers. From the static mixer the composition passed through an exit zone and an exit orifice with a cross-sectional configuration A, B, C, D, E or F.

Figure 5:
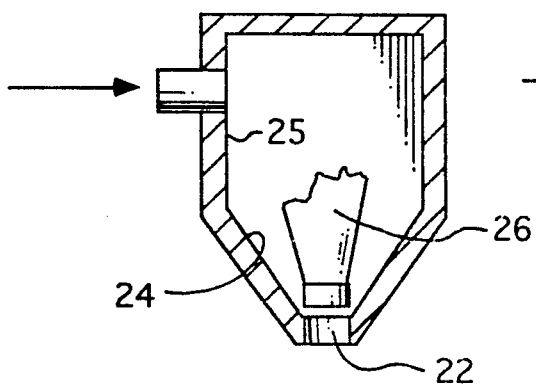

In B and C, which corresponded to FIG. 3 of the accompanying drawings, and F, which corresponds to FIG. 5, the interior angle (IA) defined by the conical portion (24) of the wall of the exit zone adjacent to the orifice relative to the cylindrical section of this wall was 150 degrees. In D, corresponding to FIG. 3 and E, corresponding to FIG. 4, this angle was 158 degrees.

The diameter of the exit orifice, exit zone and the thickness of the nozzle at the location of the exit orifice of the seven nozzles evaluated were as follows:

| Nozzle Diameter | FIG./IA (in/mm) | Orifice Thickness (in/mm) | Exit Zone Diameter (in/mm) | Nozzle Thickness |
|---|---|---|---|---|
| A | 2/90° | 0.030/0.76 | 0.345/8.8 | 0.066/1.7 |
| B | 3/150° | 0.030/0.76 | 0.348/8.8 | 0.129/3.3 |
| C | 3/150° | 0.041/1.04 | 0.363/9.2 | 0.131/3.3 |
| D | 3/158° | 0.030/0.76 | 0.386/9.8 | 0.120/3.0 |
| E | 4/158° | 0.030/0.76 | 0.240/6.1 | 0.120/3.0 |
| F | 5/150° | 0.030/0.76 | 0.348/8.8 | 0.368/9.3 |

| Nozzle Diameter | FIG./1A (in/mm) | Orifice Thickness (in/mm) | Exit Zone Diameter (in/mm) | Nozzle Thickness |
|---|---|---|---|---|
| G* | | 0.0830/2.1 | N.A. | 0.728/18.5 |

*Evaluated for comparative purposes. Nozzle supplied with static mixer was used as the exit nozzle. The exit chamber was cylindrical, 0.25 inch in diameter, tapering to a 0.0830 inch (2.1 mm) -diameter nozzle with an internal angle of 140°. For nozzles A-F the nozzle supplied with the static mixer was removed.

EXAMPLE 1

This example demonstrates the effect of nozzle configuration and diameter on the type and diameter of the cells in a low density cured foam.

Part A of the curable composition used to prepare the low density foam contained the following ingredients:

- 63.1 parts of a dimethylvinylsiloxy-terminated polydimethylsiloxane exhibiting a viscosity of 55 Pa.s;
- 13.9 parts of a benzene soluble resinous copolymer containing triorganosiloxy units and $SiO_2$ units in the molar ratio of about 0.7 mol of triorganosiloxy units per mol of $SiO_2$ units, where the triorganosiloxy units are trimethylsiloxy and dimethylvinylsiloxy, and the copolymer contains about 1.8 weight percent of vinyl radicals;
- 15.1 parts of alumina trihyhdate;
- 7.32 parts of benzyl alcohol; and
- 0.54 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent.

Part B of the curable composition contained the following ingredients:

- 46.2 parts of a dimethylvinylsiloxy-terminated polydimethylsiloxane exhibiting a viscosity of 55 Pa.s;
- 10.1 parts of the benzene soluble resinous copolymer described in part A;
- 26.4 parts of pulverized quartz exhibiting an average particle diameter of 5 microns;
- 12.6 parts of a 82 weight percent solution in xylene of the reaction product of equal parts by weight of (1) a liquid trimethylsiloxy-terminated polymethylhydrogensiloxane with a silicon-bonded hydrogen content of about 1.6 weight percent, and (2) a resinous organosiloxane copolymer consisting essentially of $(CH_3)_3SiO_2$ and $SiO_2$ unit with a molar ratio of $CH_3)_3SiO_{\frac{1}{2}}SiO_2$ units of from 0.4:1 and 1.2:1, and from about 0.5 to about 3 weight percent of hydroxyl groups; and
- 4.7 parts of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent.

The viscosity of an uncured mixture of parts A and B was between 60 and 70 Pa.s.

The static mixer used as the mixing zone was 8.75 inches (22.2 cm.) long, 0.25 inch (0.64 cm.) in internal diameter and contained 32 Kenics type elements.

The air pressure supplied to the pump was 50, 60, or 75 psig (0.34, 0.41 or 0.52 MPa.) and the pump had a power factor of 12. To ensure reproducibility of the samples, all were obtained during the upstroke of the pump cycle.

The samples were from 25 to 75 grams in weight and were collected on a flat surface located about 1 cm. below the exit orifice. The samples were allowed to remain under ambient conditions until they cured, which typically required from ¼ to 4 hours. The time required to develop a non-tacky surface was about 7 minutes.

Samples measuring 1.5 by 1.5 inches (3.8 by 3.8 cm.) were cut from each of the cured foams for evaluation. Evaluation included an examination of the surface of each sample, the cells in the area immediately beneath the surface, and in the remainder of the sample. In addition, the size range of the cells were measured. In many samples the cell size in the area immediately below the surface was different than the size in the remainder of the foam.

The density of the foam samples were about 12 pounds per cubic foot.

The results of the evaluation of the foam samples are recorded in Table 1. For comparative purposes foams were prepared without using a nozzle of the present invention. In this instance the foamable composition was collected using the nozzle supplied as part of the static mixer. The diameter of the exit orifice of this nozzle was 0.0830 inch (2.1 mm). This nozzle was removed and replaced by one of the nozzles identified as A, B, C, D, E, and F to prepare the other foam samples listed in Table 1.

TABLE 1

| Sample No. | Nozzle | Pump Pressure (psig) | Cell Structure | | |
|---|---|---|---|---|---|
| | | | Surface | Sub-Surface | Remainder |
| 1* | None | 75 | open, >5 mm | open, 3–5 mm | same |
| 2* | None | 60 | open & closed, >5 m | oval, open, 3–5 mm | same |
| 3 | E | 60 | closed, ≦1 mm | oval, closed, ≦1 × 2 mm | same |
| 4 | B | 75 | open, ≦1 mm | closed, ≦1 mm | open, 1 × 5 mm. |
| 5 | B | 60 | open, ≦1 mm | ≦1 mm, depth = 3 mm | oval, 1–5 mm |
| 6 | B | 50 | open, ≦1 mm | ≦1 mm, depth = 10 mm | oval, 1 × 4 mm |
| 7 | C | 75 | open, ≧1 mm | oval, ≦3 × 7 mm | same |
| 8 | C | 60 | open, 1 mm | 1–2 mm, depth =0 15 mm | 2 × 5 mm** |
| 9 | C | 50 | closed, ≦1 mm | ≦1 mm throughout | about 5% < 1 mm |
| 10 | F | 75 | open, ≧2 mm | ~2 mm, depth = 20 mm | oval, <2 × 6 mm |
| 11 | F | 60 | closed, ≦2 mm | 1–2 mm, uniform | same |
| 12 | F | 50 | closed, ≦2 mm | ≦1 mm, depth = 10 mm | oval, ≦3 mm |
| 13 | A | 75 | closed, ≦2 mm | 1–2 mm, depth = 2 mm | oval, ~2 × 4 mm |
| 14 | A | 60 | open + closed, 2 mm | 1–3 mm, non-uniform | same |
| 15 | A | 50 | closed, 1–3 mm | 1–3 mm, uniform | same |
| 16 | D | 75 | closed, 1–3 mm | ≦1 mm | 80% = ≦1 mm |

TABLE 1-continued

| Sample No. | Nozzle | Pump Pressure (psig) | Cell Structure | | |
|---|---|---|---|---|---|
| | | | Surface | Sub-Surface | Remainder |
| 17 | D | 50 | closed, 1-2 mm | ≦1 mm, more uniform than No. 16 | |

*Comparative Example, used nozzle supplied as part of static mixer
**Non-uniform size distribution

EXAMPLE 2

This example demonstrates the effect of exit zone configuration, nozzle size and the number of static mixer elements on the size and uniformity of cells in a high density foam exhibiting a density of about 10 pounds per cubic foot.

Part A of the curable composition used to prepare the foam contained the following ingredients:

39.85 parts of a dimethylvinylsiloxy terminated polydimethylsiloxane having a viscosity of about 55 Pa.s;

32.68 parts of a dimethylvinylsiloxy-terminated polydimethylsiloxane exhibiting a viscosity of about 9 Pa.s at 25 degrees C.

7.17 parts of a benzene soluble resinous copolymer containing triorganosiloxy units and $SiO_2$ units in the molar ratio of about 0.7 mol of triorganosiloxy units per mol of $SiO_2$ units, where the triorganosiloxy units are trimethylsiloxy and dimethylvinylsiloxy, and the copolymer contains about 1.8 weight percent of vinyl radicals;

13.24 parts of calcium carbonate 3.82 parts of 1,4-butanediol;

1.33 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent; and 0.19 part of cyclic methylvinylsiloxanes.

Part B of the curable composition contained the following ingredients:

58.9 parts of a dimethylvinylsiloxy-terminated polydimethylsiloxane exhibiting a viscosity of 55 Pa.s;

13.8 parts of the benzene soluble resinous copolymer described in part A;

14.6 parts of an 82 weight percent solution in xylene of a reaction product of equal weights of (1) a liquid trimethylsiloxy-terminated polymethylhydrogensiloxane with a silicon-bonded hydrogen content of about 1.6 weight percent, and (2) a resinous organosiloxane copolymer consisting essentially of $(CH_3)_3SiO_{\frac{1}{2}}$ and $SiO_2$ units with a molar ratio of $CH_3)_3SiO_{\frac{1}{2}}SiO_2$ units of from 0.4:1 and 1.2:1; the copolymer can be prepared as described in U.S. Pat. No. 2,676,182, and typically contains from about 0.5 to about 3 weight percent of hydroxyl groups;

9.1 parts of a liquid trimethylsiloxy-terminated polymethylhydrogensiloxane with a silicon-bonded hydrogen content of about 1.6 weight percent; and 3.6 parts of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent.

12.6 parts of a 82 weight percent solution in xylene of the reaction product of equal parts by weight of (1) a liquid trimethylsiloxy-terminated polymethylhydrogensiloxane with a silicon-bonded hydrogen content of about 1.6 weight percent, and (2) a resinous organosiloxane copolymer consisting essentially of $(CH_3)_3SiO_{\frac{1}{2}}$ and $SiO_2$ unit with a molar ratio of $CH_3)_3SiO_{\frac{1}{2}}SiO_2$ units of from 0.4:1 and 1.2:1, and from about 0.5 to about 3 weight percent of hydroxyl groups; and 4.7 parts of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent.

The viscosity of an uncured mixture of parts A and B was between 20 and 25 Pa.s.

Foam sample were prepared and evaluated as described in Example 1. The nozzles used were types B and E described in Example 1. For comparative purposes foams were prepared using the nozzle supplied with the static mixer.

In all instances the diameter of the static mixer was 0.25 inch (6.35 mm). The mixer referred to as I was 8.75 inches (22.2 cm.) long and contained 32 Kenics type elements (L/D ratio=35); the mixer referred to as II was 2.75 inches (6.98 cm.)long and contained 8 Kenics type elements (L/D ratio=11) and the mixer referred to as III was 4.75 inches (12.07 cm) long and contained 16 Kenics type elements (L/D ratio=19).

The air pressure supplied to the pump was 50, 60, or 75 psig (0.34, 0.41 or 0.52 MPa.) and the pump had a power factor (output pressure/input pressure) of 12. To ensure reproducibility of the samples, all were obtained during the upstroke of the pump cycle.

All of the samples were from 25 to 75 grams in weight and were collected on a flat surface located about 1 cm. below the exit orifice. The samples were allowed to remain under ambient conditions until they cured, which typically required from ¼ to 4 hours. The time required to develop a non-tacky surface was about 7 minutes.

Samples were prepared and evaluated as described in the preceding Example 1. The density of the foam samples were about 10 pounds per cubic foot.

The results of the evaluation of the foam samples are recorded in Table 2. For comparative purposes foams were prepared without using a nozzle of the present invention. In this instance the foamable composition was collected using the nozzle supplied as part of the static mixer. The orifice diameter of this nozzle 0.0830 inch (2.1 mm). This nozzle was removed and replaced with nozzle type B or E to prepare the other foam samples listed in Table 2.

TABLE 2

| Nozzle Type | Mixer Type | Pump Pressure (psig) | Cell Structure Surface | Cell Structure Sub-Surface | Remainder |
|---|---|---|---|---|---|
| None* | I | 75 | rough, open cells | 1-2 mm, depth = 15 m | large gaps |
| None* | I | 60 | rough, open cells | 1-5 mm, non-uniform | |
| None* | I | 50 | less rough than 1 | oval, uniform, 3-5 mm | |
| None* | I | 25 | sm. amt. open cells | 1-5 mm, most uniform | |
| E | I | 75 | 50% open cells | 1-5 mm, large cavities | |
| E | I | 60 | ~40% open cells | Oval, 3-10 m, 80% < 5 mm | |
| E | I | 50 | ~10% open cells | <1 mm, depth = 2 m | 1-5 mm |
| B | I | 75 | no open cells | ≦1 mm throughout, 90% uniformity | |
| B | I | 60 | no open cells | ≦1 mm, depth = 10 mm | oval, 1-2 mm |
| B | I | 50 | similar to sample 9 | | |
| B | II | 70 | 10% open cell | <1-2 mm, depth = 5 mm | oval, 2-5 m |
| B | II | 30 | open cells | burst cell walls, 1-5 mm, stiff foam | |
| B | III | 70 | — | <1 mm throughout foam | |
| B | III | 30 | smooth, no cells | <1 mm, depth = 5 mm | ≦1 mm |

*Comparative example, used nozzle supplied with static mixer

EXAMPLE 3

This comparative example demonstrates the need for a nozzle of the configuration associated with the present apparatus for preparing high density foams at high production rates.

Part A of the foamable composition was prepared by blending the following ingredients to homogeneity:

63.1 parts of the polydimethylsiloxane described in Example 2; 13.9 parts of the resinous organosiloxane copolymer described in Example 2;

15.1 parts of alumina trihydrate 7.3 parts of benzyl alcohol; and 0.5 part of a reaction product of hexachloroplatinic acid and sym-tetramethyldivinyldisiloxane that had been diluted with a liquid dimethylvinylsiloxy terminated polydimethylsiloxane in an amount sufficient to achieve a platinum content of 0.7 weight percent.

The two parts of the foamable composition were placed in the two storage containers of the mixing and dispensing apparatus used to prepare the foam samples of Example 1. In this instance the nozzle was the one supplied with the static mixer. The diameter of the exit orifice of this nozzle was 0.095 inch (2.4 mm.). The mixer was 7.87 inches (20 cm.) long, 0.37 inch (0.94 cm) in diameter and contained 24 Kenics type elements. Part B of the foamable composition was prepared by blending the following ingredients to homogeneity:

46.2 parts of the polydimethylsiloxane of Example 2;

10.1 parts of the resinous organosiloxane copolymer described in Example 2;

12.6 parts of a 82 weight percent solution in xylene of the reaction product of equal parts by weight of (1) a liquid trimethylsiloxy-terminated polymethylhydrogensiloxane with a silicon-bonded hydrogen content of about 1.6 weight percent, and (2) a resinous organosiloxane copolymer consisting essentially of $(CH_3)_3SiO_{\frac{1}{2}}$ and $SiO_2$ unit with a molar ratio of $(CH_3)_3SiO_{\frac{1}{2}}:SiO_2$ units of from 0.4:1 and 1.2:1, and from about 0.5 to about 3 weight percent of hydroxyl groups; and 4.7 parts of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent The pump pressure was 60 psig and the flow rate of the curable composition was varied by adjusting the size of the channel in the air-actuated valve (metering device). The flow rates used were 25, 100 and 120 grams per minute.

The quality of the resultant cured foam was evaluated as described in Example 1, and the results are recorded in the following table 3.

TABLE 3

| Flow rate (g/min) | Cell Structure Surface | Cell Structure Sub-Surface | Remainder |
|---|---|---|---|
| 25 | Closed cells, small bubbles | ≦2 mm, depth = 1 cm | 1-2 mm, oval |
| 100 | Textured, large bubbles | >3 mm, voids | |
| 120 | Textured, large bubbles | >3 mm, voids | |

This example demonstrates that while prior art nozzle configurations can be used to prepare high density foams, the flow rate must be below 100 grams per minute.

That which is claimed is

1. A method for blending and dispensing a foamable organosiloxane composition comprising an organohydrogensiloxane, a reactant selected from the group consisting of curable polyorganosiloxanes containing silanol groups, water and liquid alcohols, and a curing catalyst, the method comprising transporting said composition under pressure first through a mixing zone consisting essentially of a channel having an inlet and an outlet and containing a plurality of static mixing elements positioned within the channel, where the ratio of the length of said channel to its diameter is at least 11, and second through an exit zone communicating with the outlet of said channel and comprising a nozzle containing an exit orifice where the diameter of said exit orifice does not exceed 1.50 mm.

2. A method according to claim 1 where said composition is transported through said mixing and exit zones under a pressure of from 200 to 1000 psi (1.4 to 7 MPa), the flow rate of said composition through said apparatus is from 10 to 120 grams per minute, and the foam exhibits an average cell diameter of less than 5 mm and a density of from 10 to 30 pounds per cubic foot (160 to 480 kg. cm$^3$).

3. A method according to claim 2 where said composition comprises an organohydrogensiloxane, at least one curable polyorganosiloxane containing at least two groups bonded to silicon selected from the group consisting of hydroxyl groups and alkenyl radicals, and an amount of a curing catalyst sufficient to promote foaming and curing of said composition, with the proviso that if the composition does not contain an amount of a hydroxyl-containing polyorganosiloxane sufficient to react with said organohydrogensiloxane to generate the gaseous hydrogen required to form a foam, said composition contains an amount of water or an alcohol sufficient to form said foam, where the silicon-bonded organic groups present in said polyorganosiloxane and said organohydrogensiloxane are selected from the group consisting of unsubstituted and substituted monovalent hydrocarbon radicals.

4. A method according to claim 3 where at least one of the hydrocarbon radicals bonded to each silicon atom of said polyorganosiloxane and said organohydrogensiloxane is methyl and the remainder are selected form the group consisting of methyl, phenyl and 3,3,3-trifluoropropyl, said alkenyl radical is vinyl, said curing catalyst is a tin compound, a platinum group metal or a compound of said metal, the viscosity of said composition is from 1 to 200 Pa.s, and said composition comprises an alkenyl-containing polyorganosiloxane and from 1 to 10 weight percent, based on the weight of said composition, of an alcohol.

5. A method according to claim 4 where said composition contains a reinforcing or non-reinforcing filler.

* * * * *